Sept. 22, 1953  R. J. VICKERS  2,653,044
GATE FASTENER
Filed Jan. 24, 1952
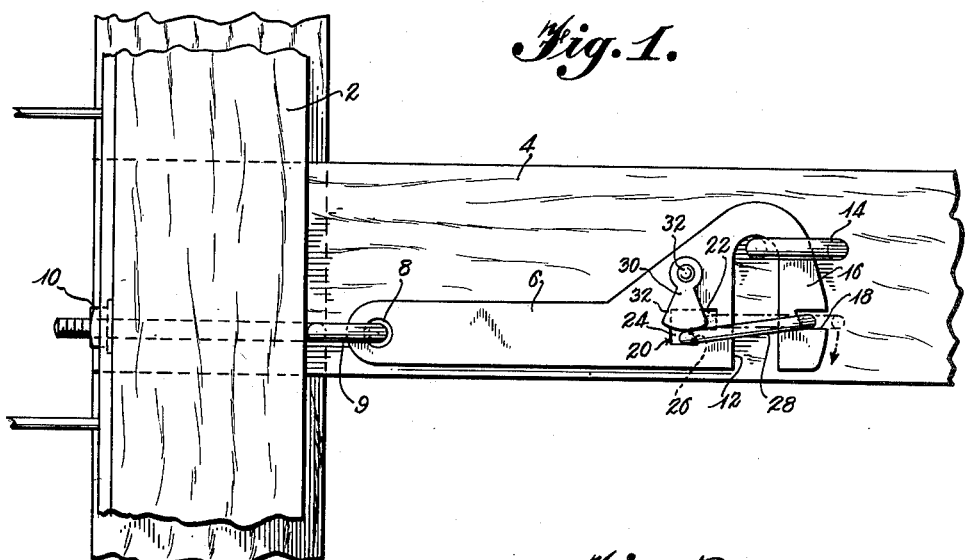
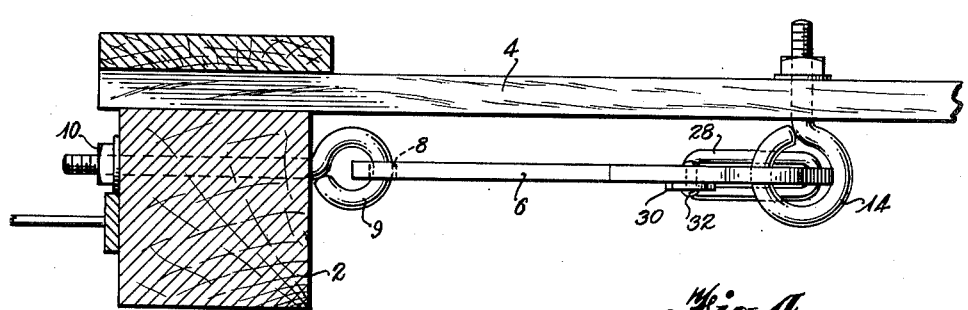
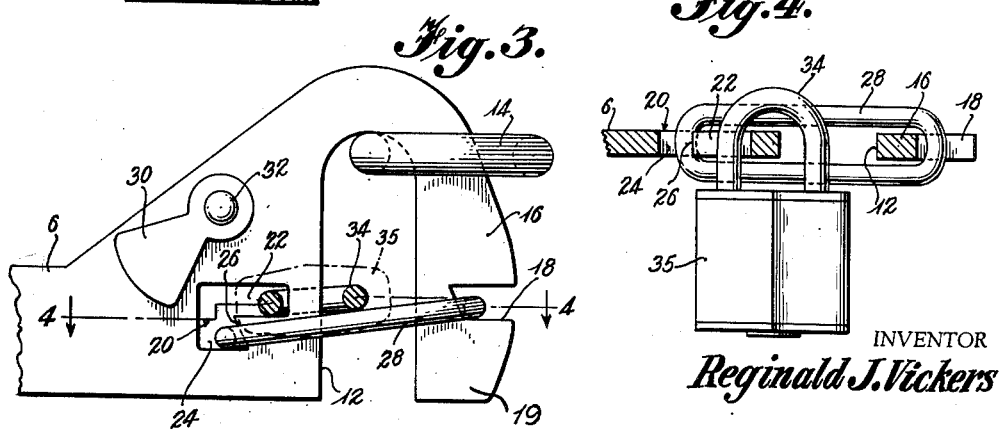
INVENTOR
Reginald J. Vickers
BY Bacon & Thomas
ATTORNEYS Patented Sept. 22, 1953

2,653,044

UNITED STATES PATENT OFFICE 2,653,044

GATE FASTENER

Reginald J. Vickers, The Plains, Va.

Application January 24, 1952, Serial No. 268,007

8 Claims. (Cl. 292—108)

This invention relates to gate fasteners and particularly to means for fastening and holding gates in closed position in such manner that the fastener will not become inadvertently disengaged.

It is well known that many animals, such as cows and horses, often become proficient at opening gates or the like by discovering a manner of manipulating the fastening means to release the same. The present invention relates to a gate fastener practically impossible to disengage by any manipulation of which the usual farm animals are capable.

The fastener of the present invention further provides for locking the same by means of a conventional padlock without alteration of the basic structure or any additions thereto.

It is therefore an object of this invention to provide a novel and improved gate fastener.

It is another object of this invention to provide a gate fastener so designed as to prevent inadvertent release thereof.

It is another object of this invention to provide a gate fastener, the release of which requires simultaneous manipulations of parts practically impossible for the usual farm animals to perform.

It is a still further object of this invention to provide a gate fastener that may be readily locked at will by means of a conventional padlock or the like.

It is a still further object of this invention to provide a gate fastener simple in construction and economical to make.

Still further objects and advantages will appear to those skilled in the art as the description proceeds with reference to the accompanying drawings wherein:

Fig. 1 is a side elevational view of a fastener of the present invention in place on a gate structure;

Fig. 2 is a plan view of the elements shown in Fig. 1;

Fig. 3 is an enlarged fragmentary side elevation of a portion of the fastener shown in Fig. 1; and Fig. 4 is a fragmentary sectional view taken substantially along the line 4—4 of Fig. 3.

Referring to the drawings, 2 indicates a vertical gatepost defining one side of the usual gateway opening. 4 indicates a fragmentary portion of a gate arranged to close the opening between gateposts. It is contemplated that the gate shown in the drawings be opened by sliding movement to the right as seen in Fig. 1 or by vertical movement of that portion shown in the drawings. In the event the fastener of the present invention is applied to a conventional swinging gate, the fastener shown would be arranged to extend from a portion of the gatepost 2 in a direction perpendicular to the general plane of the gate 4 rather than parallel to it as shown in Figs. 1 and 2.

The fastener of the present invention comprises a body member 6 in the form of a flat metal plate and having an opening 8 at one end thereof by which it is adapted to be pivotally secured to the gatepost 2 by such means as eyebolt 9. The eye-bolt may be secured to the gatepost by nut 10 or may be permanently secured thereto in any other convenient manner. The opposite end of the body member 6 defines an enlarged head as shown in Fig. 1 and is provided with a notch 12 extending upwardly from its lower edge defining a latch receiving notch adapted to receive a portion of a latch element 14 which may be the eye-bolt shown or which may be a staple or headed stud fastened to the gate 4. The notch 12 separates the enlarged portion of the body 6 into a main body portion and a projecting finger 16, which finger actually defines one side of the notch 12. The finger 16 is provided with a keeper notch 18 extending generally perpendicular to the notch 12. If desired, the functions of the notch 18 may be performed by a single abutment corresponding to the portion 19 shown in Fig. 3 projecting to the right from the outer edge of the finger 16. As will be apparent later, the lower surface of the notch 18 performs all the intended functions and the outer portions of the finger 16 directly above the notch 18 may be omitted.

The body portion 6 is also provided with an L-shaped opening 20 therethrough on the side of notch 12 opposite that side defined by the finger 16. The opening 20 has a leg portion 22 extending generally in the direction of the notch 18 and a second leg portion 24 remote from the notch 18 and extending generally parallel to the notch 12. The leg 24 of opening 20 is defined in part by an abutment or shoulder 26 which faces in a direction away from notch 18 and is spaced from the opposite end of the leg 22 by a distance about equal to the depth of notch 18.

A keeper 28, in the form of an elongated and closed metal loop, has a portion thereof extending through the opening 20 and of such dimension that it may be slidably moved about in the opening 20 and pivoted relative to the body 6 in a plane generally coincident with the plane of the body 6. Keeper loop 28 is of such dimension that it may be positioned as shown in dotted lines in Fig. 1 wherein the portion passing through opening 20 is at its forward position in the leg 22 and the opposite end thereof is clear and free of notch 18 in position to be swung downwardly to extend generally vertically from the portion in the opening 20. When the keeper loop 28 is in the position shown in full lines in Fig. 1 it closes the lower portion of the notch 12, by extending thereacross, and prevents upward withdrawal of the finger 16 from the latch element 14. The element 14 is fixed to the gate 4 in any suitable manner and it will be obvious that retention of the finger 16 in the shown relationship to the element 14 will hold the gate in closed position.

In applying the fastener to a gate to hold the same closed the parts may be moved to position finger 16 in the element 14 as shown in Fig. 1 but wherein the loop 28 hangs freely from the opening 20. The loop may then be so manipulated that the portion passing through the opening is moved to the right end of the leg 22 whereupon the loop may then be swung upwardly to the dotted line position and moved to the left to move its outer end into the notch 18 and permit the portion in opening 20 to drop into the leg 24 and behind the abutment 26. The length of the loop 28 and the position of abutment 26 are such that the abutment prevents sliding movement of the loop to the right sufficiently to release the loop from the notch 18. Gravity normally holds the upper loop 28 in the solid line position shown in Fig. 1.

A retainer member 30 is pivoted as at 32 to the body member 6 in a position generally directly above the leg 24 of opening 20 and has a pendulous portion 32 having a lower surface engageable with the left end of the keeper loop 28 when the latter is in leg 24 of opening 20. Preferably the retainer 30 is made freely pendulous to assume the position shown in Fig. 1 under the influence of gravity. Under such circumstances the keeper 28 may be moved to the position shown in solid lines in Fig. 1 whereupon retainer 30 will swing, under the influence of gravity, to the position shown and thus retain the keeper in gate latching position. It will be clear that it is practically impossible for any farm animal to swing the retainer 30 to one side and move the keeper 28 to the dotted line position of Fig. 1 to effect release of the gate. If desired the retainer 30 may be mounted on a relatively tight pivot so that forcible manual manipulation will be required to move it to keeper releasing position and back to retaining position.

Figs. 3 and 4 illustrate the manner in which the gate may be locked against release by unauthorized persons. The opening 20, and particularly the leg 22 thereof, is of such dimension and is so positioned relative to notch 12 that the loop portion 34 of a conventional padlock 35 may be applied in the manner shown to prevent release of the keeper 28 even upon withdrawal of the retainer 30.

While a single specific embodiment of the invention has been shown and described herein it is to be understood that many modifications may be resorted to without departing from the scope of the invention as defined by the appended claims.

I claim:

1. A fastener comprising; a body portion having a first notch in one side thereof, an opening through said body spaced from said notch, a second notch in said body extending from an edge thereof between said first notch and said opening and of a depth to extend a sufficient distance across a line from said first notch to said opening to accommodate a latch element between said line and the bottom of said second notch, said first and second notches opening in directions at substantially right angles to each other, a closed loop member extending through said opening and being moveable therein in a direction toward and from said first notch, the extent of movement of said loop in said opening being at least equal to the depth of said first notch and the dimensions of said loop being such that a portion thereof may move into and out of said first notch when said loop extends across said second notch, a shoulder on said body defining a portion of said opening facing away from said first notch and so positioned that the said loop may be moved to engage said shoulder when said portion thereof is in said first notch.

2. A fastener as defined in claim 1 including a retainer moveably carried by said body and engageable with said loop, when said loop is in engagement with said shoulder, to retain said loop engaged with said shoulder.

3. A fastener as defined in claim 2 wherein said retainer is a pendulous member pivoted to said body and having a portion moveable therewith under the influence of gravity into loop-engaging position.

4. A fastener comprising; a body having a finger projecting therefrom and defining a latch-receiving notch with a portion of said body, an abutment adjacent the free end of said finger and on the side thereof opposite said notch, an opening through said body on the side of said notch remote from said finger, a keeper member having a first portion extending through said opening and a second portion adapted to be positioned adjacent the outer edge of said finger inwardly of said abutment with a third portion extending across said notch, the dimensions of said keeper and opening being such that the first portion of said keeper may move in said opening toward said finger sufficiently to permit said second portion to swing clear of said abutment and remove said third portion of said keeper from across said notch, and a shoulder defining a part of said opening and facing away from said finger and so positioned that said first portion may be moved into engagement with said shoulder when said second portion is inwardly of said projection.

5. A fastener comprising; a body having a finger projecting therefrom and defining a latch-receiving notch with a portion of said body, a keeper notch in the outer edge of said finger, a two-legged generally L-shaped opening through said body on the side of said notch opposite said finger, one leg of said opening extending toward said keeper notch and the other leg thereof being remote from said keeper notch, a keeper loop having a first portion extending through said opening for movement along said legs and for rotation relative to said body, the dimensions of said parts being such that said loop may be swingably positioned to extend across said latch-receiving notch with a second portion of said loop adjacent said keeper notch with said first portion in said one leg, and such that the loop may then be moved to position said second portion in said keeper notch and said first portion in said other leg.

6. A fastener as described in claim 5 including a retainer pivoted to said body and arranged to swing into position to prevent movement of said first portion of said loop out of said other leg of said opening.

7. A fastener as described in claim 5 wherein said body and finger comprise integral portions of a flat metal plate.

8. A fastener as described in claim 5 including a further opening through said body for pivotally attaching said fastener to a supporting structure.

REGINALD J. VICKERS.

References Cited in the file of this patent

UNITED STATES PATENTS

| Number | Name | Date |
|---|---|---|
| 455,149 | Ayers | June 30, 1891 |
| 656,817 | Hilton | Aug. 28, 1900 |
| 1,007,213 | Lau | Oct. 31, 1911 |
| 1,767,251 | Madland et al. | June 24, 1930 |
| 1,785,882 | Taylor | Dec. 23, 1930 |
| 2,470,706 | Larson | May 17, 1949 |